April 1, 1941.  A. OBERHOFFKEN  2,236,732
OPERATING LEVER MECHANISM
Filed Jan. 2, 1940  2 Sheets-Sheet 1
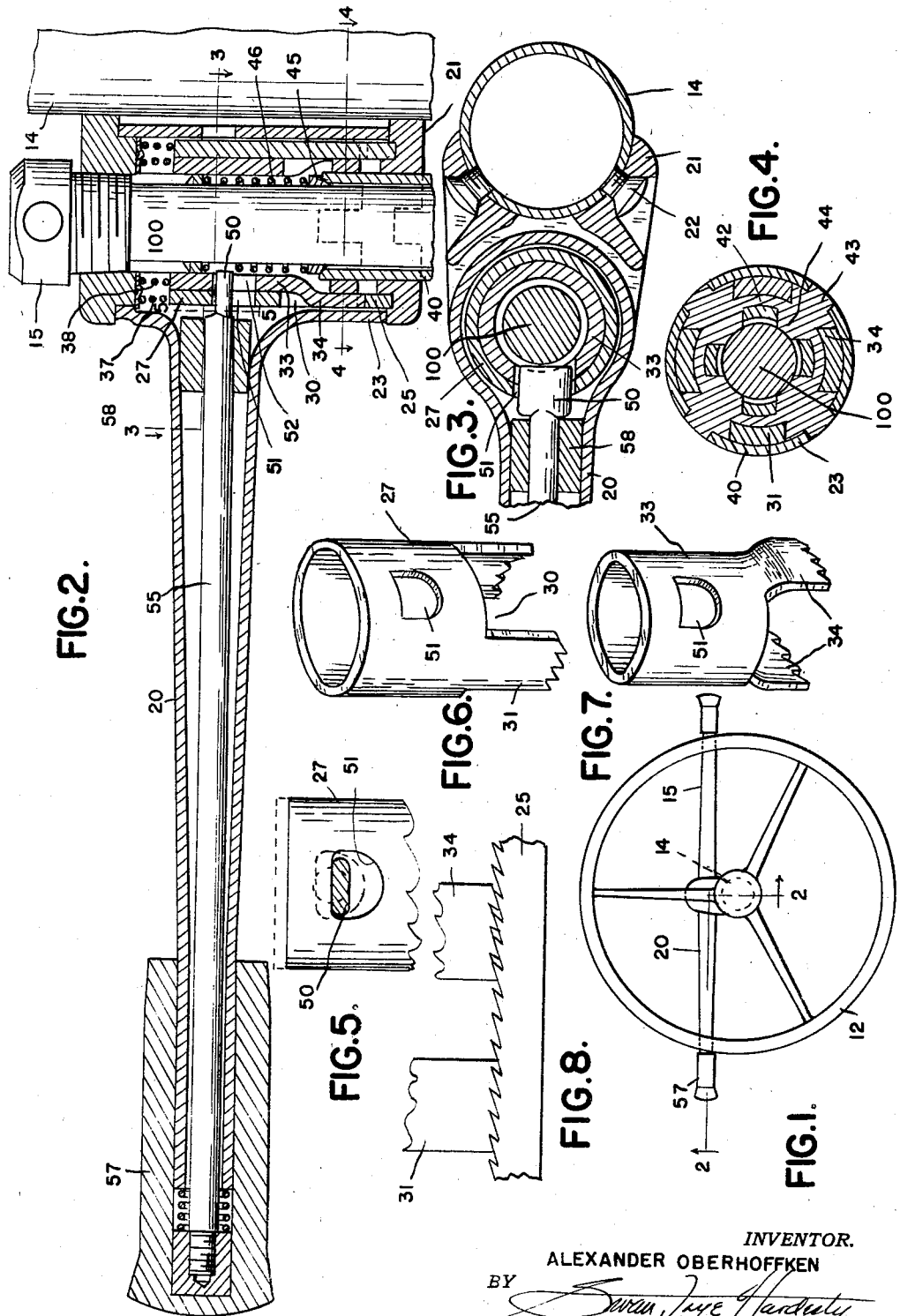
INVENTOR.
ALEXANDER OBERHOFFKEN
BY
ATTORNEYS April 1, 1941.  A. OBERHOFFKEN  2,236,732
OPERATING LEVER MECHANISM
Filed Jan. 2, 1940  2 Sheets-Sheet 2
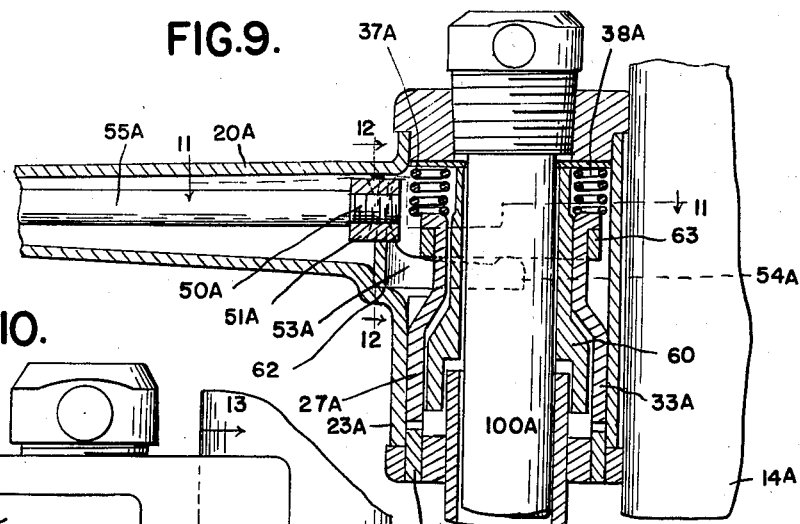
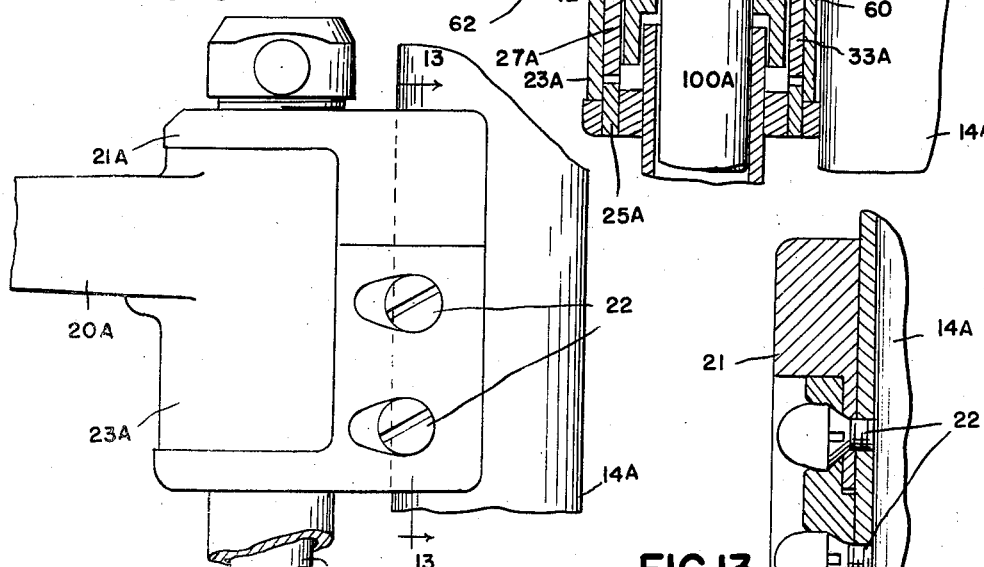
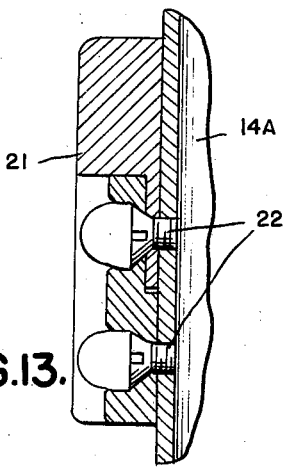
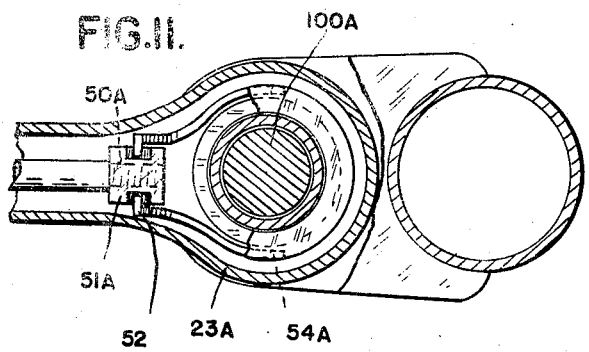
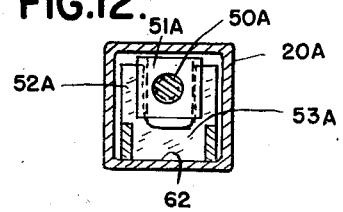
INVENTOR.
ALEXANDER OBERHOFFKEN
BY
ATTORNEYS Patented Apr. 1, 1941

2,236,732

UNITED STATES PATENT OFFICE 2,236,732

OPERATING LEVER MECHANISM

Alexander Oberhoffken, Southfield Township, Oakland County, Mich., assignor to The American Forging & Socket Company, Pontiac, Mich., a corporation of Michigan Application January 2, 1940, Serial No. 311,973

5 Claims. (Cl. 74—527)

This invention relates to operating lever mechanisms of the ratchet controlled type, particularly, but not exclusively, adapted for use in controlling the operation of the emergency brakes of motor vehicles.

An important object of the invention is to provide such a lever mechanism which is adapted to be mounted on the steering column or steering wheel support of a motor vehicle, in a position complementary to that of the gear shift lever, in cars having gear shift levers so mounted, the invention being designed to permit the hand brake lever to project in the opposite direction, directly beneath the steering wheel, in position for convenient manipulation by the driver's left hand.

Mounting the brake operating lever in the position indicated upon the steering column not only imposes practical limits upon its length, however, but also upon the size of the ratchet means which may be employed, since, for the sake of appearance, the ratchet mechanism must be housed in a hub or centrally located casing which is of neat appearance and relatively small size. The smaller the radius of the ratchet, however, the greater must be the angular displacement of the lever to advance it one tooth along the ratchet, assuming ratchet teeth of equal size. Considerations of strength also render it undesirable to reduce the size of the ratchet teeth to too small proportions, while the problem is further aggravated by the fact that the smaller the ratchet radius, the greater is the strength required in the ratchet teeth and cooperating pawl portions. The present invention aims to overcome the difficulties outlined, by means of an improved pawl and ratchet mechanism, which although very compact in size, and adapted to be incorporated in a hub of small, neat appearance, is of great strength and yet affords very fine step-by-step lever positions, despite the fact that the ratchet teeth themselves, and the cooperating pawl portions, are of massive proportions and great strength.

Another object is to provide cooperating pawl and ratchet portions formed of cylindrical sleeves engageable and disengageable by axial movement of one toward and from another, and so designed that a plurality of concentric tubular pawl elements move alternately to and from engagement with the same ratchet teeth, the pawls having circumferentially staggered holding or dogging parts offset from each other in such proportion to the length of the ratchet teeth as to provide holding means acting in finer steps than the length of the teeth.

A further object is to provide such a multiple pawl arrangement in which each pawl is provided with a plurality of teeth simultaneously engageable with the ratchet means, whereby the strength of the holding portions is materially increased.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a plan view of the steering wheel of a motor vehicle and its supporting steering column, showing one of my improved operating levers mounted appurtenant the same.

Figure 2 is a longitudinal section taken substantially on the line 2—2 of Figure 1, and looking in the direction of the arrows.

Figure 3 is a sectional view, taken substantially as indicated by the line and arrows 3—3 of Figure 2.

Figures 4 and 5 are sectional details taken respectively on the lines 4—4, and 5—5, of Figure 2, and looking in the direction of the arrows.

Figures 6 and 7 are detail perspective views of the outer and inner pawl elements, respectively.

Figure 8 is a detail developed view of the ratchet ring and two of the holding portions of the outer and inner pawl elements.

Figure 9 is a view similar to Figure 2, with the lever partly broken away, showing a somewhat modified construction.

Figure 10 is a side elevational view of the modified embodiment.

Figures 11 and 12 are sectional views taken respectively on the lines 11—11, and 12—12, of Figure 9, and looking in the direction of the arrows; and Figure 13 is a sectional detail taken substantially on the line 13—13 of Figure 10, and looking in the direction of the arrows.

Referring now to the drawings:

Reference character 12 designates the steering wheel of a motor vehicle (unshown). The steering wheel is indicated as supported upon a steering column 14, which also supports the gear shift lever 15, as well as my improved brake operating assembly, the lever of which is designated 20.

A casing 21 is attached to the steering column, as by means of screws 22, and supports a sleeve-like hub portion 23, integral with the lever, for swinging movement about an axis parallel to that of the steering column. The casing 21 will be seen to be centrally cut away to receive the hub section of the lever, which cooperates with the end sections of such casing to enclose the pawl and ratchet mechanism.

The shaft 100 by which the gear shift lever 15 is connected to the transmission (unshown) may extend through the entire assembly to a position thereabove, where the gear shift lever is mounted, such shaft being unconnected to the brake mechanism and surrounded thereby.

Mounted in a suitable recess in the lower portion of the casing 21 is a cylindrical ratchet member 25, having upwardly directed ratchet teeth. A tubular pawl member 27, of corresponding diameter, is mounted directly above the ratchet element and provided with cooperating downwardly projecting teeth. The pawl member 27 is cut away, upon opposite sides as indicated at 30, so that its ratchet engaging portions constitute a pair of oppositely disposed downwardly projecting toothed holding portions 31, as best shown in Figure 6. Similar spaced downwardly directed toothed holding portions 34 carried by the inner pawl 33 are outwardly offset to lie in the spaces 30. The two pawl members are independently vertically slidable, so that their toothed holding portions may move to and from the teeth and ride over the same independently. Springs, as 37, 38, bear downwardly upon each of the pawls 27, 33, assisting the force of gravity and tending to maintain each pawl in holding engagement with the ratchet 25 regardless of the position of the other.

The upper extremity of the tubular shaft 40 by which the motion is imparted to the brake rigging (unshown) or other mechanism to be controlled is arranged at its upper end to provide key ways adapted to interfit with keying means in the form of a keying ring 42 having appropriately positioned lugs 43, 44, the former projecting outwardly into suitably positioned slots in the hub 23 of the lever, and the latter projecting inwardly to engage the key ways in shaft 40. This will be seen to lock the lever to the shaft. A self-centering bearing ring 45 is fitted into a conical seat formed at the top of the brake actuating shaft 40, and is forced into its seat by a spring 46, thereby tending to maintain the transmission shifting shaft 100 centered.

Aligned openings 51, 52 are formed in the outer and inner pawl elements 27, 33 respectively, these openings also registering with the hollow interior of the lever. The flat cam portion 50 projects into the openings, the cam portion being carried by the shaft 55, which is rotatable, to turn the cam and lift the pawls, by means of a handle 57 rotatably mounted at the end of the lever. The inner end of the shaft is supported by a bearing sleeve 56 fitted into the lever.

The teeth carried by the holding portions 31, 34, of the pawls are offset with relation to each other in such manner that when teeth of one pawl are in holding engagement with the ratchet ring, the teeth of the other pawl lie substantially half way between two holding positions. The effective length of the ratchet teeth is thus approximately halved. The relative arrangement of the teeth is indicated in Figure 8, which comprises a development view of two of the holding portions 31 and 34 and the ratchet ring 25.

Despite the independent movement of the pawls to and from the ratchet as they ride over the teeth, the pawls may be lifted together by turning the cam 50 through the agency of the handle 57, whenever it is desired to release the brake. As shown in Figure 5, the holes 51, 52 are of insufficient size to permit the flat cam section 50 to be turned to a position perpendicular to the horizontal top walls of the openings, so that the springs 37, 38 constantly tend to urge both pawls downwardly into engagement with the ratchet, and at the same time tend to turn the cam 50 toward horizontal position.

In operation, the rotation of the handle 57 serves to swing the flat cam portion 50 to simultaneously raise both of the pawls 27, 33 out of engagement with the ratchet ring 25. Thus if, in use with an emergency vehicle brake, such freeing of the pawls is effected when the brake has been set, the springs of the brake will serve to immediately release the brake while the pawls are being held out of engagement with the ring 25. In order to set the brake, it is only necessary to swing the lever 20 without rotating the handle 57. In so doing the pawls 31, 34 will alternately grip and ride over the ratchet teeth of the ring 25, whereby one or the other of the pawls will always be in position to prevent retrograde movement of the lever 20 and shaft 40. This alternate engagement and lifting of the pair of ratchet members 27, 33 serve to accomplish the desired fine adjustment of the brake lever, while comparatively large and strong ratchet teeth or utilized therewith. For example, if each ratchet tooth interval is one-eighth of an inch, the result with my improved arrangement will be the same as though ratchet teeth spaced only one-sixteenth of an inch were used, with, however, the strength attendant on the larger one-eighth inch thick.

In the somewhat modified construction shown in Figures 9 to 13 inclusive, throughout which parts corresponding to those already described have been given like reference characters distinguished by the addition of the letter "A" to each, the pawl means comprises a plurality of alternately arranged pawl elements 27A, 33A circumferentially arranged with the cylindrical hub 23A and independently movable as they ride over the toothed ratchet ring 25A. In this embodiment four pawl portions are provided having teeth staggered in such manner that one set of pawls engages the teeth upon movement of the lever an angular distance corresponding to one-fourth the length of a ratchet tooth. Individual springs 37A, 38A bear downwardly against the tops of the pawls, which are out-turned to provide seats for the springs as well as to provide an abutment for a ring 63 which is fitted loosely therearound to allow independent movement of the pawls. An inner sleeve 60 loosely surrounding the shaft 100A positions the pawls and springs, which are trapped between such sleeve and the interior of the hub 23A.

Simultaneous lifting of the pawls may be effected by turning the shaft 55A, which extends outwardly through the interior of the lever 20A and is connected to a hand grip portion (unshown), which may correspond to the hand grip 57 shown in the embodiment first described. The inner end of the shaft is threaded, as indicated at 50A, and fitted thereupon is a traveller nut 51A having its sides slotted to receive the spaced arms 52A of a bellcrank lever 53A having a pair of substantially horizontal arms 54A, projecting into the hub upon either side of the pawl assembly in position to underlie the ring 63 whereby the ring 63 may be raised upon turning of the handle shaft 55A to lift all of the pawls free of the ratchet, as will already be apparent from inspection of Figure 10. The pivotal support for the bell crank is provided by so shaping the sheet metal casing at the juncture of the hub and lever, as to provide a seat upon which the corner of the bell crank may rock, such a seat being shown at 62 in Figure 10.

The operation of the modification illustrated in Figures 9 to 13 inclusive will be readily apparent. Rotation of the handle 57 will swing the bell crank lever 53A into position to simultaneously lift all of the pawl elements from the ratchet ring 25A, and thereby permit the retraction of the brake, or like element with which my improved lever mechanism is connected, under the impulse of its own spring mechanism. When the handle 57 is in normal position, however, the horizontal arms 54A of the bell crank lever permit the lowering of the ring 63 into position permitting independent movements of the several pawl elements 27A, 33A, whereby at least one of them will always be in contact with the ratchet teeth of the ring 25A, while the others are in various positions riding over the ratchet teeth, whenever the lever is swung. For example, if there are four ratchet elements 27A, 33A, arranged at 90° intervals, and the ratchet teeth are of one-eighth inch size on the ring 25A, the effect will be secured by my improved arrangement as if ratchet teeth of one-thirty-second inch size were employed, with, however, the strength attendant on use of the larger one-eighth inch teeth. Very fine adjustments of an emergency brake, for example, can be secured without the use of extremely fine ratchet teeth and without loss of power.

The casings are formed in initially separate upper and lower sections to enable assembling the parts within the hubs in the manner shown.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

What I claim is:

1. In combination, an operating lever, a turnable member connected thereto, and pawl and ratchet mechanism arranged to prevent unwanted turning thereof, comprising a ratchet ring fixed adjacent said member, a pair of co-axial cylindrical pawls carried by the lever and having spaced teeth engageable with the ratchet ring, the teeth of said pawls being circumferentially staggered and engageable with the ratchet ring at different times when the lever is swung, and means for lifting the pawls from the ring when desired.

2. In combination, an operating lever, a turnable member connected thereto, and pawl and ratchet mechanism arranged to prevent unwanted turning thereof, comprising a ratchet ring fixed adjacent said member, a pair of sleeves carried by the lever and provided with spaced pawl teeth engageable with the ratchet ring, a spring for each sleeve normally pressing its pawl teeth into engagement with the ratchet ring, the positioning of the pawl teeth of such sleeves being such that when the pawl teeth of one sleeve engage the interdental portions of the ratchet ring in position to resist retrograde movement of the lever, the teeth of the other sleeve will engage intermediate portions of the teeth of the ratchet ring, and means for moving the pawl teeth of said sleeves out of engagement with the ratchet ring.

3. In combination, an operating lever, a turnable member connected thereto, and pawl and ratchet mechanism arranged to prevent unwanted turning thereof, comprising a ratchet ring fixed adjacent said member, a pair of sleeves carried by the lever and provided with spaced pawl teeth engageable with the ratchet ring, a spring for each sleeve normally pressing its pawl teeth into engagement with the ratchet ring, the positioning of the pawl teeth of such sleeves being such that when the pawl teeth of one sleeve engage the interdental portions of the ratchet ring in position to resist retrograde movement of the lever, the teeth of the other sleeve will engage intermediate portions of the teeth of the ratchet ring, and means for moving the pawl teeth of said sleeves out of engagement with the ratchet ring, comprising a rotatable handle carried by the lever and means actuated by said handle to lift the sleeves when the handle is rotated.

4. Means as set forth in claim 3 in which said means to lift the sleeves comprises a shaft extending through the interior of the lever, a cam portion carried by the inner end of said shaft and interengageable with said sleeves to lift the latter upon rotation of the shaft, the outer end of said shaft being operatively connected to said handle.

5. Means as set forth in claim 3 in which said lever is provided with a hub portion encircling said ratchet ring and sleeves, the interior of said lever being hollow, said means to lift the sleeves comprising a shaft extending longitudinally through the hollow interior of the lever between the hub end and the outer end thereof, a cam portion carried by the hub end of said shaft and extending into openings in said sleeves and acting thereby to key the sleeves to the lever to rotate therewith, the upper ends of the openings in the sleeves providing abutment portions engageable with the cam portion whereby upon rotation of the cam portion said sleeves may be lifted, the outer end of the shaft being operatively connected to said handle.

ALEXANDER OBERHOFFKEN.